(12) United States Patent
Herrity

(10) Patent No.: US 6,735,397 B2
(45) Date of Patent: May 11, 2004

(54) SKEW DISCOVERY AND COMPENSATION FOR WDM FIBER COMMUNICATIONS SYSTEMS USING 8B10B ENCODING

(75) Inventor: Kenneth R. Herrity, Milpitas, CA (US)

(73) Assignee: Blaze Network Products, Inc., Pleasanton, CA (US)

( * ) Notice: Subject to any disclaimer, the term of this patent is extended or adjusted under 35 U.S.C. 154(b) by 596 days.

(21) Appl. No.: 09/808,855

(22) Filed: Mar. 14, 2001

(65) Prior Publication Data

US 2002/0131105 A1 Sep. 19, 2002

(51) Int. Cl.[7] .................. H04B 10/18; H04J 14/02
(52) U.S. Cl. .................. 398/158; 398/155; 398/147
(58) Field of Search .................. 398/79, 75, 147, 398/155, 158, 161; 713/503; 714/200; 375/371

(56) References Cited

U.S. PATENT DOCUMENTS 5,157,530 A * 10/1992 Loeb et al. .................. 398/79
6,031,847 A * 2/2000 Collins et al. .............. 370/508
2002/0009169 A1 * 1/2002 Watanabe .................... 375/371

OTHER PUBLICATIONS

"Long–Distance Parallel Data Link Using WDM Transmission with Bit–Skew Compenstation", Gibong Jeong; Goodman, J.W.; Lightwave Technology, Journal of, vol. 14 Issue: 5, May 1996 Page(s): 655–660.*

* cited by examiner

Primary Examiner—Leslie Pascal
Assistant Examiner—Nathan Curs
(74) Attorney, Agent, or Firm—Bruce H. Johnsonbaugh

(57) ABSTRACT

This invention uses fiber characteristics combined with knowledge of the 8b10b code to discover and compensate for skew between parallel data streams, caused by chromatic dispersion, in a WDM system allowing the receiver to recover both the data and timing of the data streams as they were originally launched. This skew discovery and compensation does not require the insertion or deletion of any control symbols to/from the original 8b10b streams, and does not require the use of a training or sample sequence.

4 Claims, 14 Drawing Sheets

Skew Discovery And Compensation System

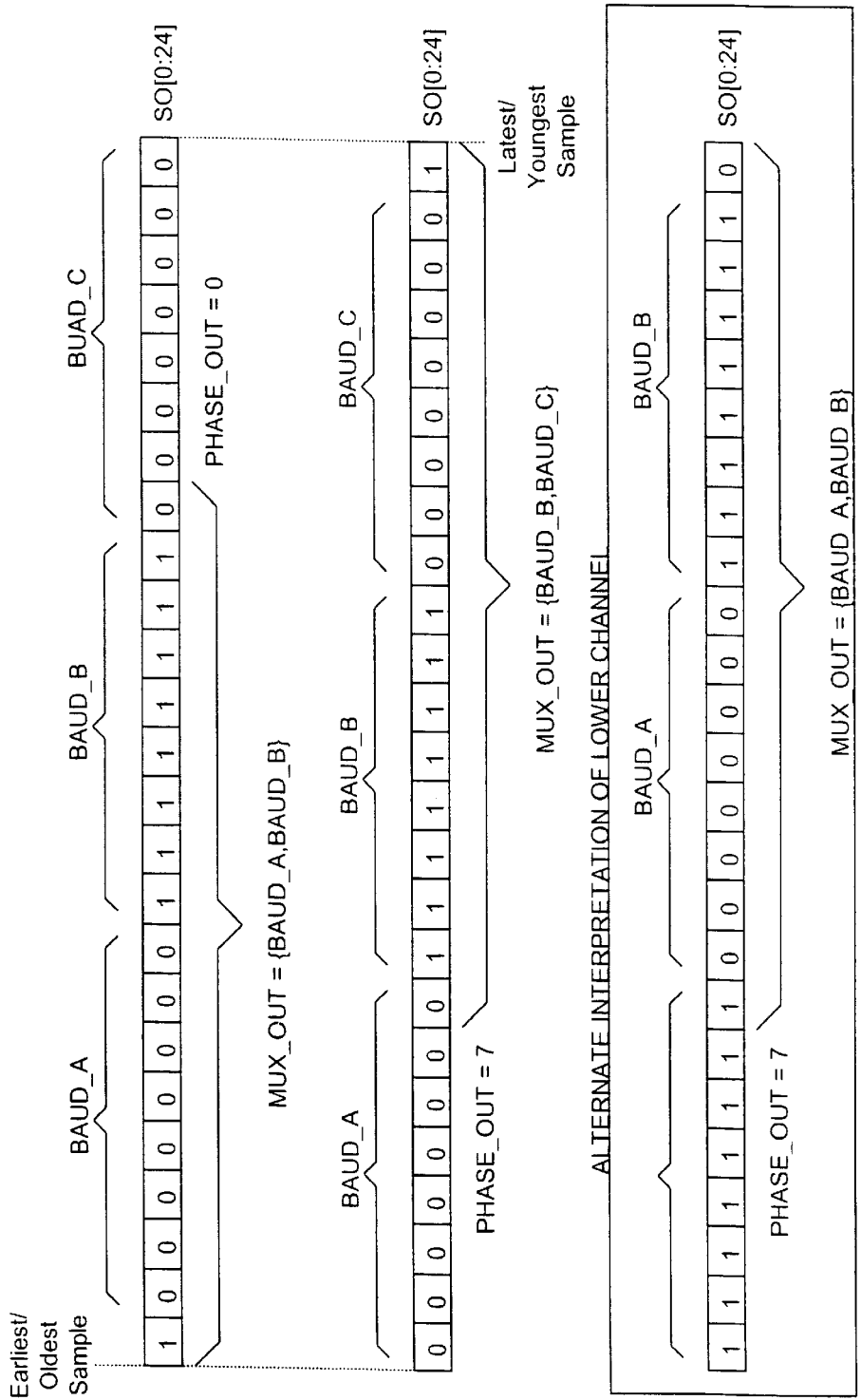

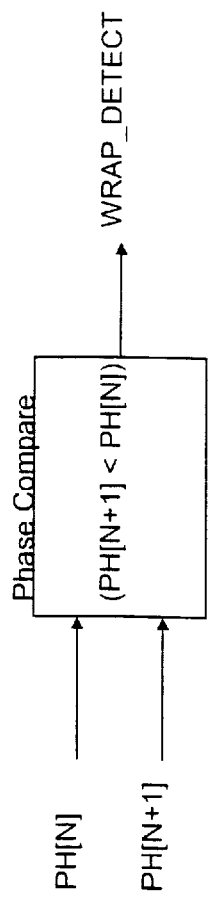
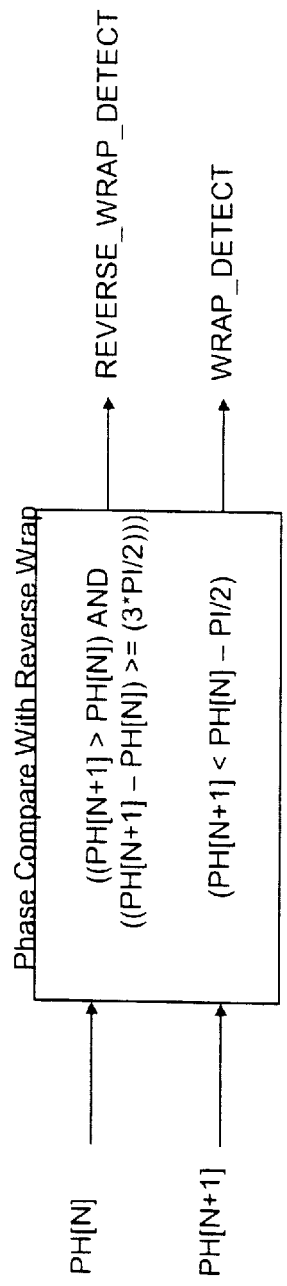

Skew Compensation (No Reverse Wrap)

SKEW DISCOVERY AND COMPENSATION FOR WDM FIBER COMMUNICATIONS SYSTEMS USING 8B10B ENCODING

BACKGROUND AND SUMMARY OF THE INVENTION

The present invention pertains to optical communications. Specifically, this invention relates to an electronic decoder/receiver which discovers the skew between N channels representing a single serial data stream and then corrects for that skew such that the original serial data stream can be reconstructed. In certain preferred embodiments, the decoder/receiver of the present invention is particularly suited for wave division multiplexing systems for fiber-optic data-communications and telecommunications. The present invention in one embodiment achieves the desired results with 8 parallel streams and the skew between the fastest and slowest channel is several bit times.

1. Description of the Problem the Invention Overcomes

As data rates have increased the useful distance for data transmission on multi-mode fiber has decreased (mostly due to modal dispersion problems). One technique to combat this problem is to divide a single data stream into N parallel streams that would be transmitted on N separate wavelengths of light on a single fiber at $1/N^{th}$ the original data rate. This wave division multiplexing (WDM) approach would result in a useful distance roughly N times the distance that was originally possible using a single serial stream.

However, in order to achieve this benefit, difficulties must be overcome associated with the fact that different wavelengths propagate at different speeds inside the fiber. Similarly, these different wavelengths may be launched at different power levels and may experience differing attenuation as they propagate through the optical system. This will result in significant variation of the signal level seen at the electronics on the receiver side. This variation will cause channels with high input levels to experience slightly less delay than channels with lower input levels, resulting in even more skew between channels (wavelengths). Moreover, since the intended application is to create a transceiver that is transparent to the end user, and since the transceiver is intended to operate with any protocol using the 8b10b code (ex. Gig-Ethernet and Fiber Channel), and since size, power and cost constraints make buffering undesirable, the skew discovery and compensation system must operate without inserting/deleting control/data blocks and without replacing any control/data blocks. Finally, this skew discovery/compensation must be accomplished in an environment where the skew between the slowest and the fastest wavelength may be several bit times.

The present invention overcomes all the difficulties described above.

2. Brief Comments Re Prior Art

Various deskewing techniques are known in the prior art, including systems requiring a training or sample signal. For example, U.S. Pat. No. 6,031,847 teaches a deskewing method that requires the use of a training sequence to measure skew between channels, as shown in FIG. 7 and required in claim 1 at column 23, lines 27–29. The use of a training sequence inherently slows the data transfer, and the use of the specially generated training sequence includes risks of contaminating the data streams. U.S. Pat. No. 6,079,035 requires the use of a sample signal (column 1, lines 38–42 and column 9, lines 6–11), with the same inherent limitations of the training sequence required by U.S. Pat. No. 6,031,847 discussed above. The present invention avoids the use of a training sequence and avoids the insertion or deletion of any control symbols relative to the original 8b10b data stream.

It is also known in the prior art to predict skew to create relative delays, as shown in U.S. Pat. No. 5,157,530. The prediction technique has serious inherent limitations requiring separate predictions as transmission conditions are changed. These limitations are overcome by the present invention which effectively measures the actual skew between channels using a phase detection technique. No predictions are required by the present invention; changes in transmission variables are automatically compensated for by the present invention.

BRIEF SUMMARY OF THE INVENTION

The present invention utilizes known characteristics of the 8b10b code in conjunction with a phase detection technique using reference clock signals to actively measure relative bit skew between sets of adjacent channels. Since the phase detection technique will create ambiguities in determining whether a detected skew of a given channel bit is either ahead or behind of an adjacent channel bit, the present invention includes techniques for resolving such ambiguities. Resolution of ambiguity includes the use of two or more decoders, each programmed with different assumptions. Additionally, confirmation of the correctness of ambiguity resolution is achieved by checking alignment of known comma characters in each of the 8b10b data streams.

A primary object of the present invention is to enable data skew discovery and compensation for 8b10b code based communication systems without replacing any control or data blocks and without using training or sample signals. This makes the invention protocol independent as long as the protocols in question use the 8b10b code.

Another object of this invention is that it can compensate for skews up to 9-bits per WDM channel space. Thus an 8-channel WDM system (with 7 spaces between the wavelengths) could be constructed that would compensate for skews up to 63-bit times.

A further object of the present invention is to enable said skew discovery and compensation without inserting or deleting control or data blocks. This eliminates the need for complex buffering and packet monitoring schemes required to support the insertion and removal of control blocks to support skew measurement and compensation.

Another object of this invention is that it is insensitive to wavelength variations caused by temperature changes at the WDM transmitter.

A further object of this invention is that it will be un-affected by non-uniform channel separations in a WDM system. For example the spacing between WDM channel 0 and channel 1 may be 10-nanometers and the spacing between channel 1 and channel 2 may be 6-nanometers and the circuit will continue to operate properly.

Still another object of the present invention is that it introduces very little latency into the receive path since it operates at the bit/block level (as opposed to the frame level).

An additional object of this invention is that it will continue to operate correctly even in the presence of some skew unrelated to the chromatic skew for which it was designed to compensate.

Further objects and advantages will become apparent from the following description and drawings, wherein:

BRIEF DESCRIPTION OF THE DRAWINGS

FIG. 9 is a Reverse Wrap Schematic;

FIG. 10 is a Phase Compare Block Diagram;

FIG. 11 is a Phase Compare with Reverse Wrap Block Diagram;

DETAILED DESCRIPTION OF THE DRAWINGS

The following description and drawings include a series of five assumptions. Those assumptions are:

(1) All N WDM channels are generated by the same clock and therefore have exactly the same frequency. This would be the normal state of a system that created N streams from a single serial data stream.

(2) Skew between adjacent channels varies less than 1-bit time at the receiver. For example, if the skew between channel 0 and 1 was 1-bit time, and this was the largest single skew in an 8 channel system, then the range of skews between the other adjacent channels (ex. Channels 5 and 6) must be 0 to 1 bit times. Similarly, if the skew between channels 2 and 3 is 2.5 bit times, and this was the largest skew in an 8-channel system, then the range of skews between the other adjacent channels (ex. Channels 7 and 8) must be 1.5 to 2.5 bit times. The invention is capable of handling skew ranges between adjacent channels that exceed one bit time, by using two or more aligners that are properly programmed.

(3) All Channels transmit complete 10-bit code blocks. Put another way, any given 10-bit code block (as defined by the 8b10b code) must be transmitted on a single channel and shall not be split across multiple channels.

(4) By design, the receiver knows the expected relationship between the 10-bit blocks of a given channel with respect to 10-bit blocks on any other channel. For example, in the preferred embodiment, the receiver expects the block boundaries of the 10-bit blocks received on each channel to occur simultaneously. This is not a requirement of the design. Other embodiments could be envisioned where the block boundaries of the 10-bit blocks received on each channel were offset by some known value. As long as the receiver could predict the expected offset, the requirements of this assumption would be satisfied.

(5) Comma characters, as defined by the 8b10b code, must occur on a regular basis on at least one of the N-channels. In this case, "a regular basis" means a known bounded interval sufficiently small to ensure that 10-bit block boundaries may be discovered quickly.

Figure 1:
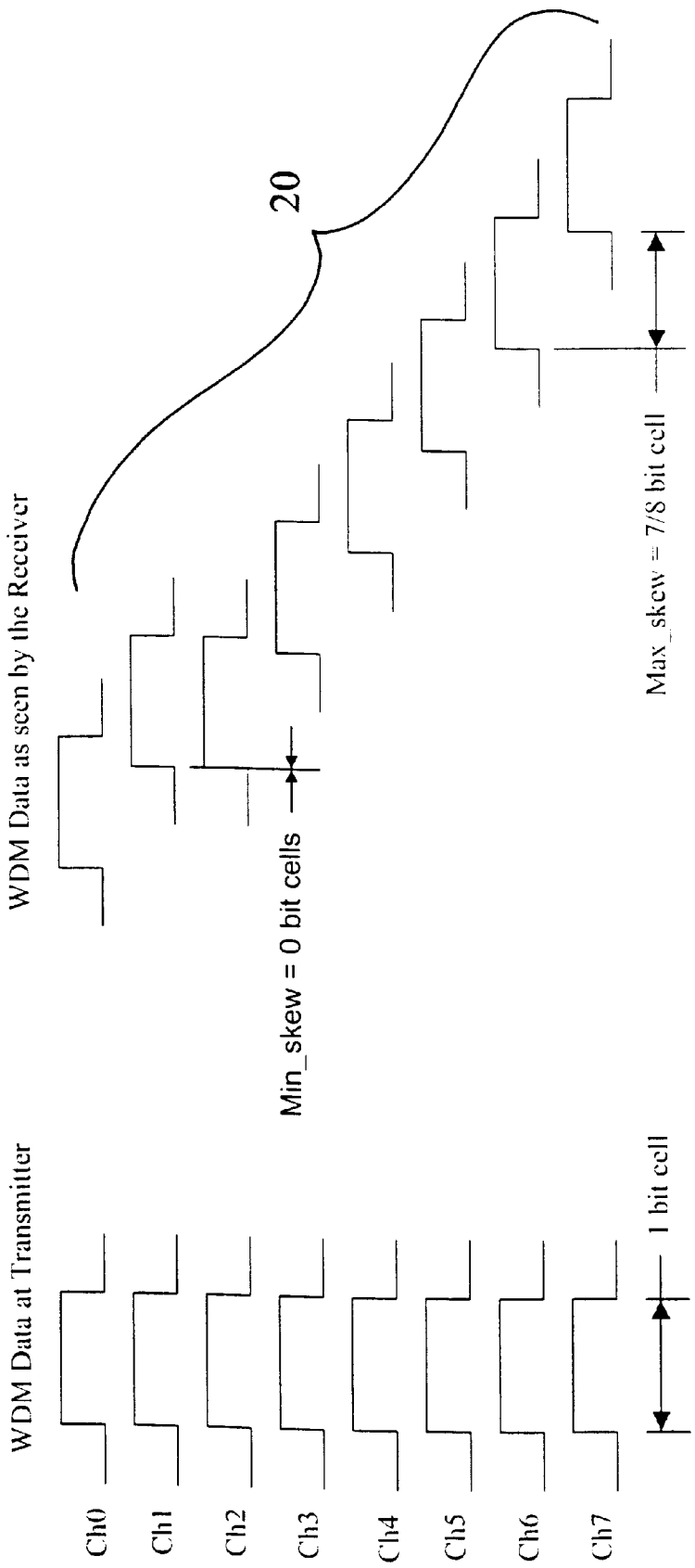
FIG. 1 is an illustration of an acceptable distribution of skews (First Example)
Figure 2:
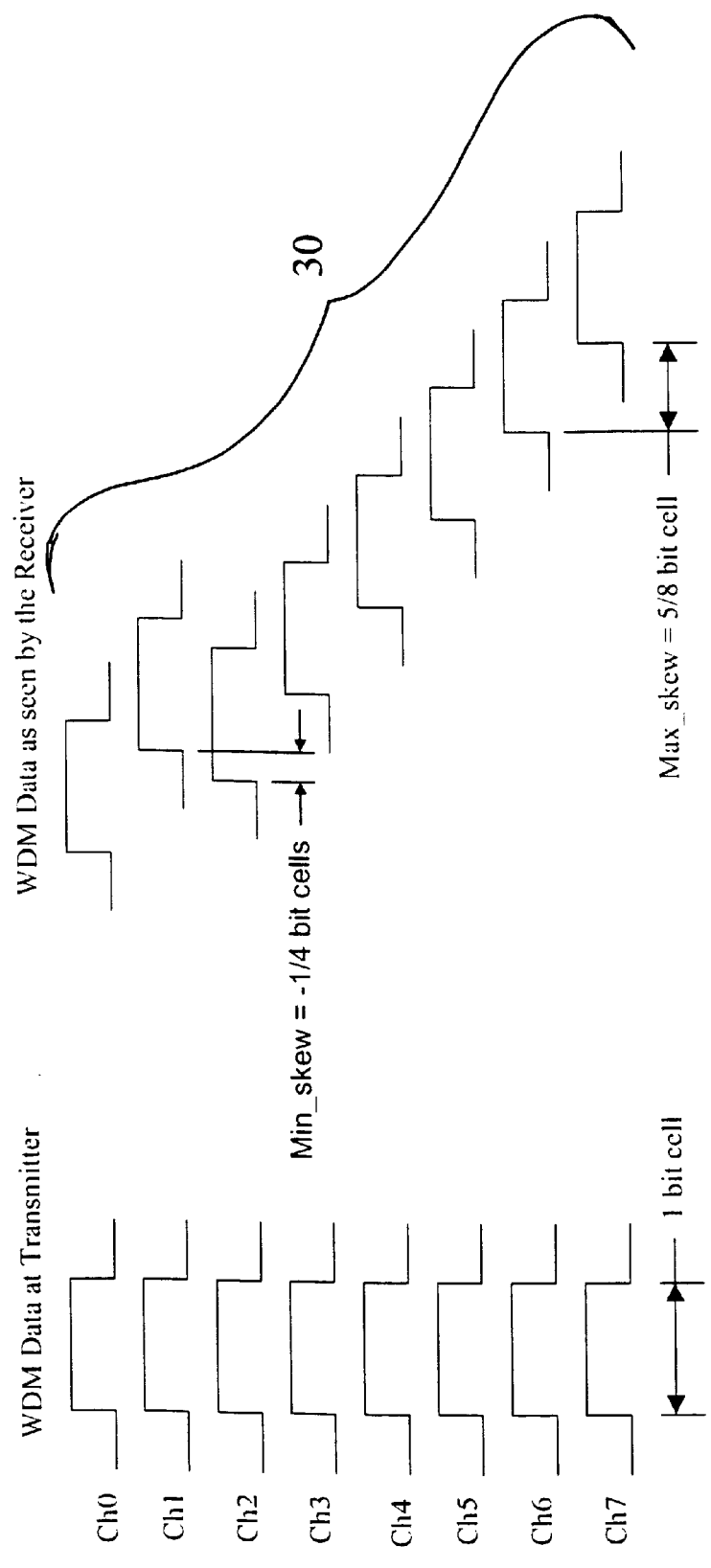
FIG. 2 is an illustration of an acceptable distribution of skews (Second Example)
Figure 3:
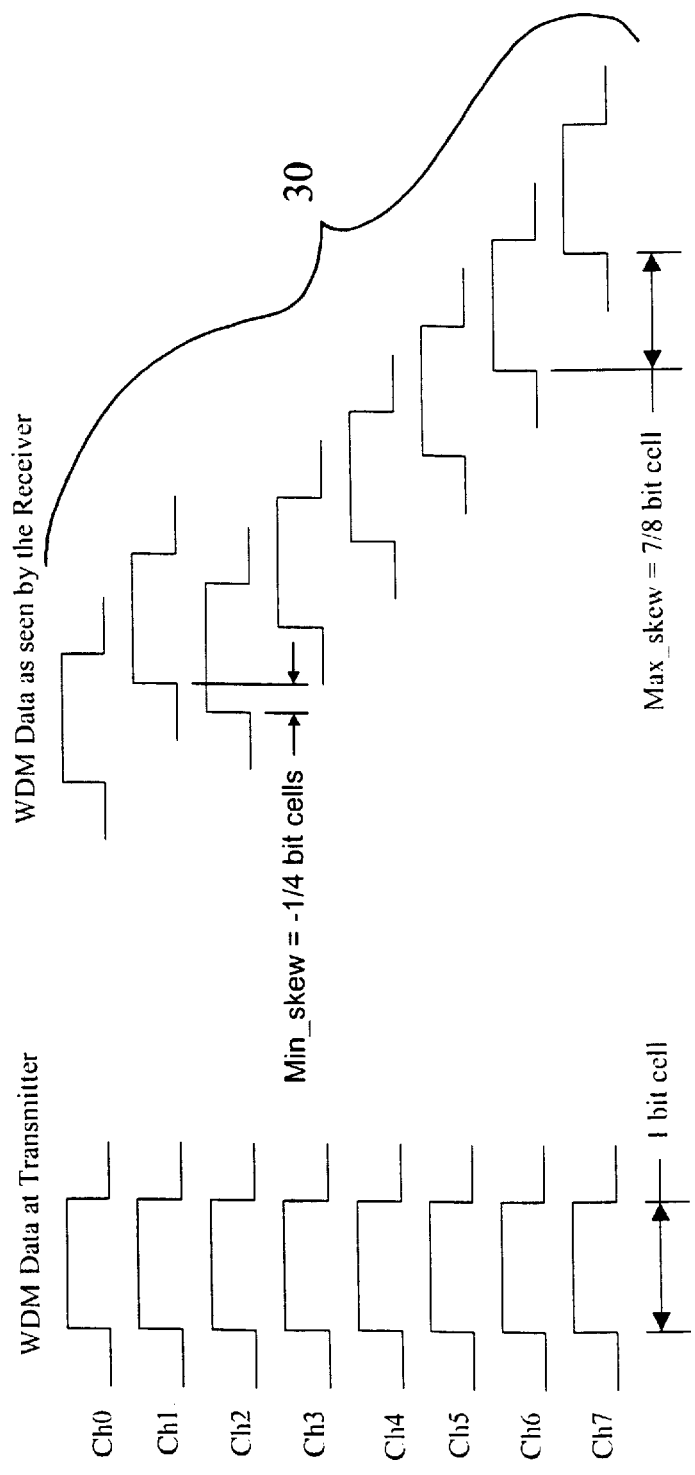
FIG. 3 is an illustration of an unacceptable distribution of skews, unless multiple aligners are utilized with appropriate programming instructions.

FIGS. 1 and 2 show acceptable skew patterns 20 and 30, respectively, that may be successfully decoded at the receiver. FIG. 3 shows an unacceptable skew pattern 30 that will not be successfully decoded at the receiver, under the above assumptions, because of excessive skew range. As noted above, the skew ranges shown in FIG. 3 can be made acceptable by using two or more aligners programmed to assume the greater skew ranges.

Figure 4:
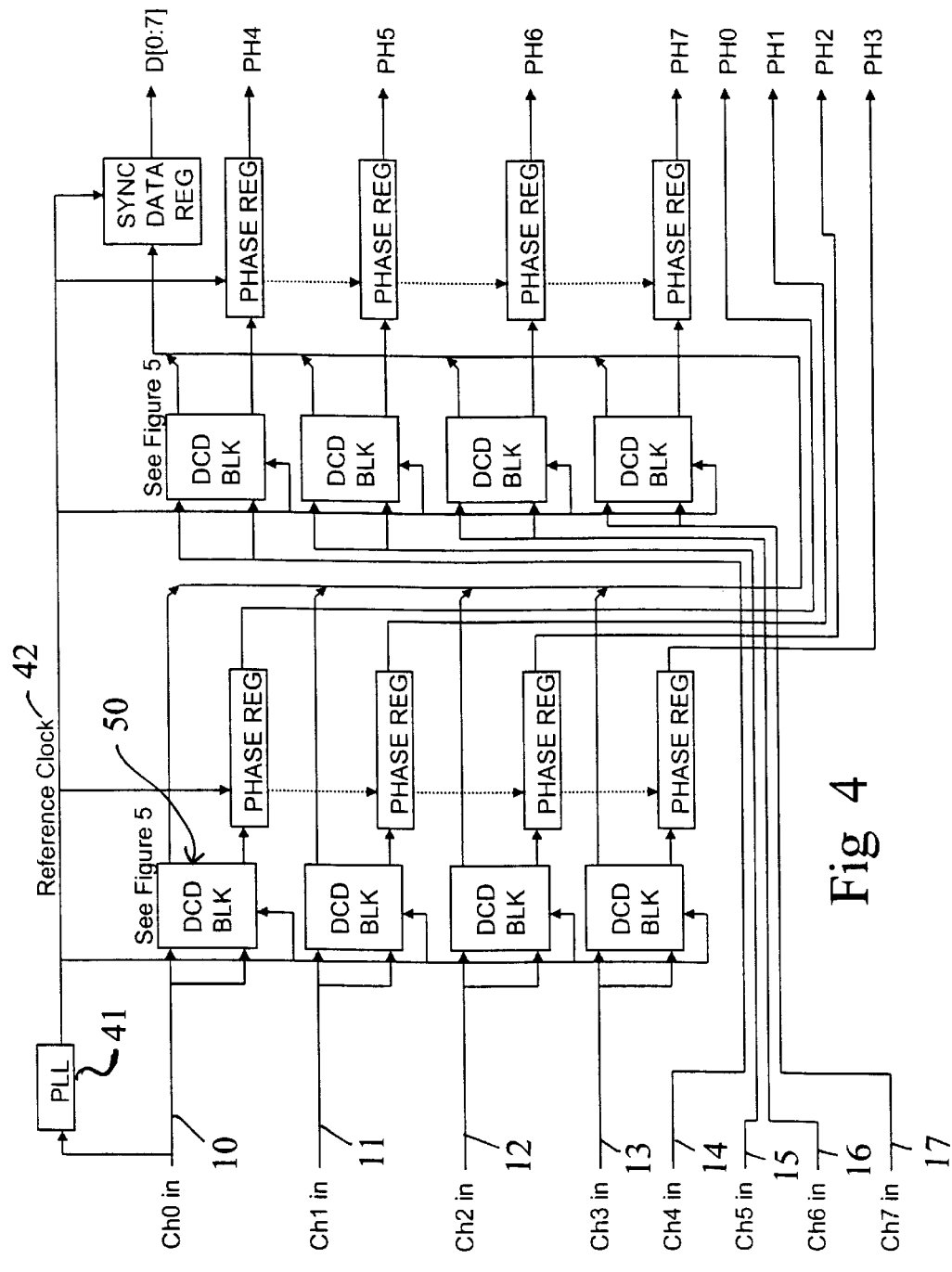
FIG. 4 is a Data and Phase Recovery Block Diagram.

The first step in the skew compensation process is to recover the frequency of the incoming data. FIG. 4 shows 8 channels 10–17, although the present invention applies to the general case of N channels. As shown in FIG. 4, this can be accomplished using a single PLL (phase lock loop) 41 attached to one of the incoming data channel 10 (only one PLL is required since all eight input channels 10–17 are generated from the same clock). Any PLL suitable for clock and data recovery from an 8b10b coded data stream may be used for this application. In FIG. 4 this PLL 41 is attached to channel 0 (reference No. 10), however it may have been attached to any of the incoming channels (10–17).

The second step is to generate an X phase reference clock. The PLL 41 is used to generate an 8-phase reference clock 42 to the Decoder Block 50 for each WDM channel. The embodiment described herein uses PLL 41 to generate an 8-phase reference clock, but the present invention applies to the general case of an X-phase reference clock. The 8 phases provide 8 sample times inside the baud period that may be used for decoding the bit value and for identifying the phase relationship of the baud period with respect to the reference clock created by the PLL 41.

As described below, the third step is to use the X phases to sample bits from each of the N channels. The fourth step is to use the samples to determine the location of the bit cell boundaries for each channel. The fifth step is to determine the phase of each of the N data streams, using the bit cell boundaries. The sixth step is to compare the phases of data streams on successive pairs of adjacent channels to determine skews or phase differentials between channels. The seventh step is to pass the determined skews or phase differentials between adjacent channels into either one or more aligners where each aligner is programmed to assume a given range of skew between adjacent pairs of N channels, and the aligner uses its programmed assumptions to align the N data streams.

The present invention in one embodiment uses a single aligner, which would be adequate for some end uses, such as a relatively short length fiber optic cable. A single aligner embodiment is limited to skew range between adjacent channels of less than one bit cell. However, the preferred form of the invention, described below and shown in the drawings, uses two aligners, which should be adequate for most end uses. The use of two aligners allows the invention to be utilized where the skew range between adjacent channels may exceed a bit cell. However, the invention is also usable with more than two aligners; i.e., where the variation in the transmit/receive electronics is severe enough to require more than two interpretations (and consequently, more than two aligners).

As described below and shown in the drawings, additional steps are required when two or more aligners are utilized. When two or more aligners are utilized, the seventh step involves passing the skews or phase differentials between adjacent channels into the two (or more) aligners and wherein each aligner uses those skews or differentials to align the N data streams based on the different assumed skew ranges programmed into each aligner.

The eighth step, used with two or more aligners, is to pass each of the two (or more) aligned data streams through a separate 8b10b decoder associated with a given aligner.

The ninth step, used with two ore more decoders, is to have each decoder check the alignment of the 8b10b block boundaries of the output of its associated aligner.

The tenth, and last, step is to select the output of one of the aligners determined by the decoders to be correctly aligned.

Figure 5:
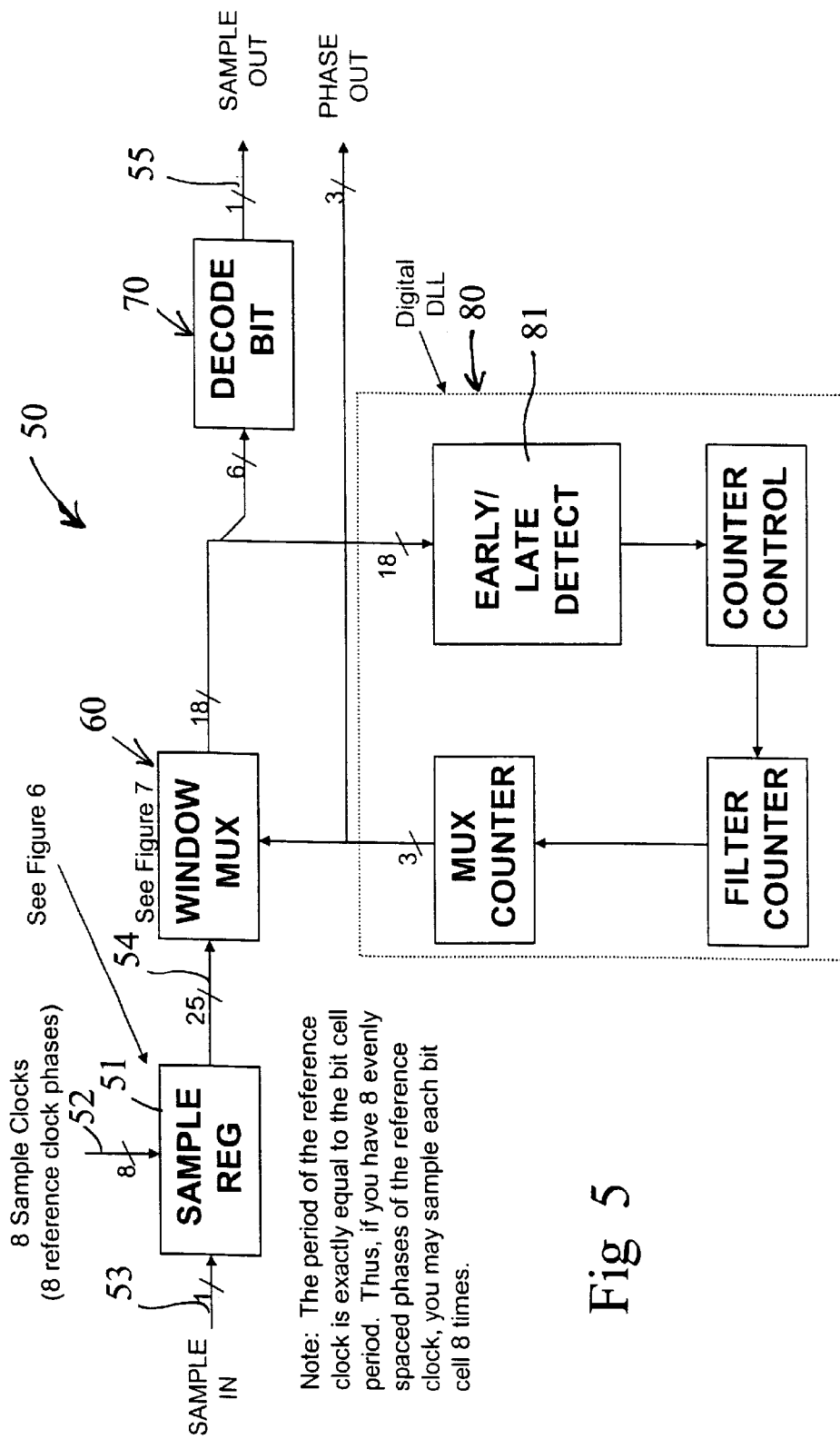
FIG. 5 is a Decoder Block Diagram.
Figure 6:
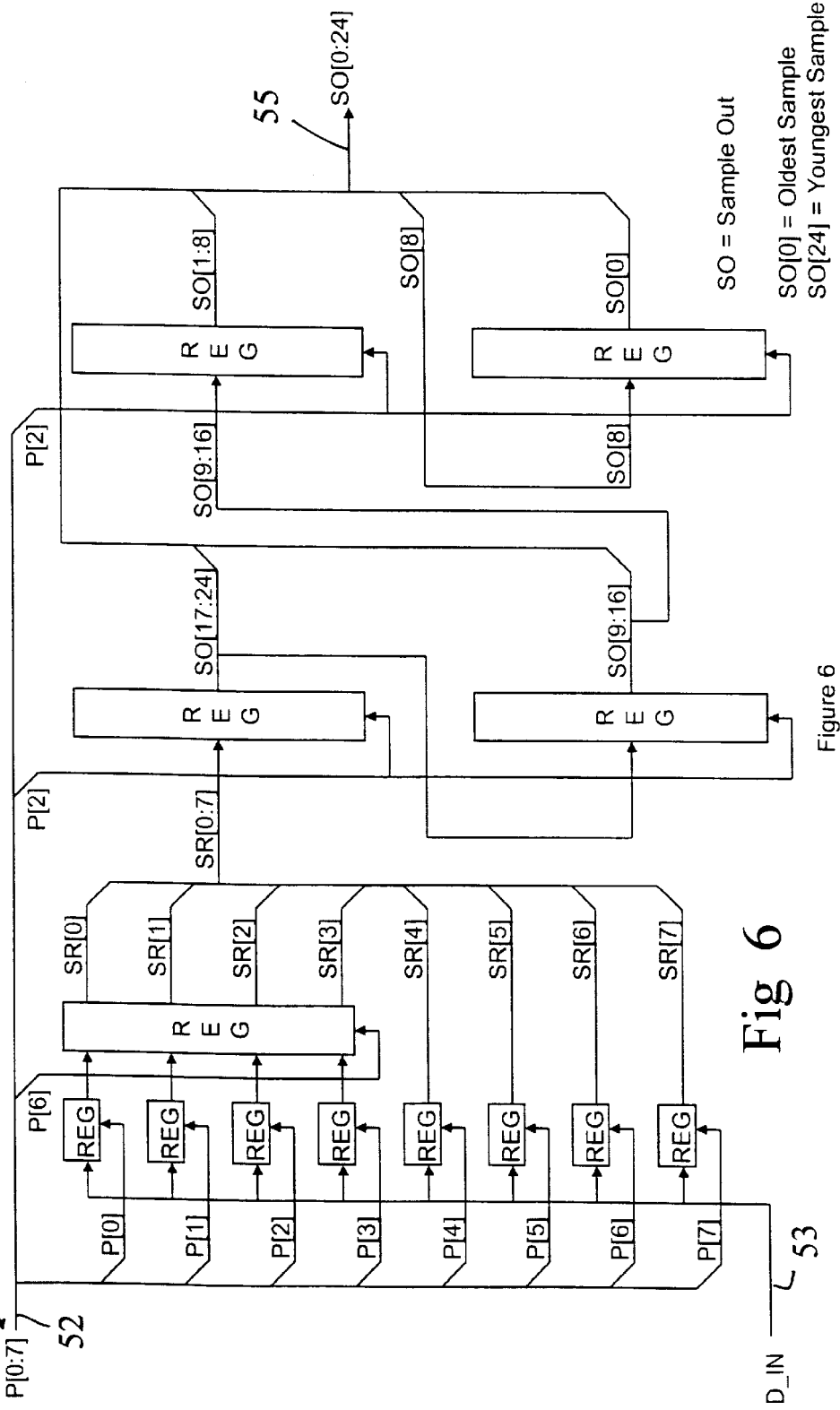
FIG. 6 is a Sampler Block Diagram.

Referring to FIG. 5, the 8-phase reference clock is fed into the sample block 51 at 52 along with the incoming sample data at 53. The Sample Block 51 (shown in detail in FIG. 6) uses the 8 phases to sample the incoming bit 8 times per baud period. Then, it synchronizes the samples such that a new set of 8 samples are presented on Sample Out bits 17 through 24 along with the previous 17 samples (bits 0 through 16) once per baud period. Thus, the sample out bus 55 is updated once per baud period. Bit 0 on this bus represents oldest/earliest sample. Bit 24 on this bus represents the youngest/latest sample.

Referring back to FIG. 5, the sample bus 54 is fed into the Window Multiplexor 60. The purpose of the this device is to select a little more than 2 baud periods of data (18-bits instead of 16-bits) for the purpose of decoding the bit represented by the youngest baud period and for the purpose checking the alignment of the Window Multiplexor 60 with respect to the real baud period. When the control input (PHASE_OUT[2:0]) of the Window Multiplexor 60 is set properly, the bauds within the output of the Window Multiplexor 60 should be aligned such that MUX_OUT (61) bits 1 through 8 represents one complete baud and MUX_OUT bits 9 through 16 represents another complete baud. Baud boundaries should occur between bits 0 and 1, bits 8 and 9, and bits 16 and 17.

Figure 7:
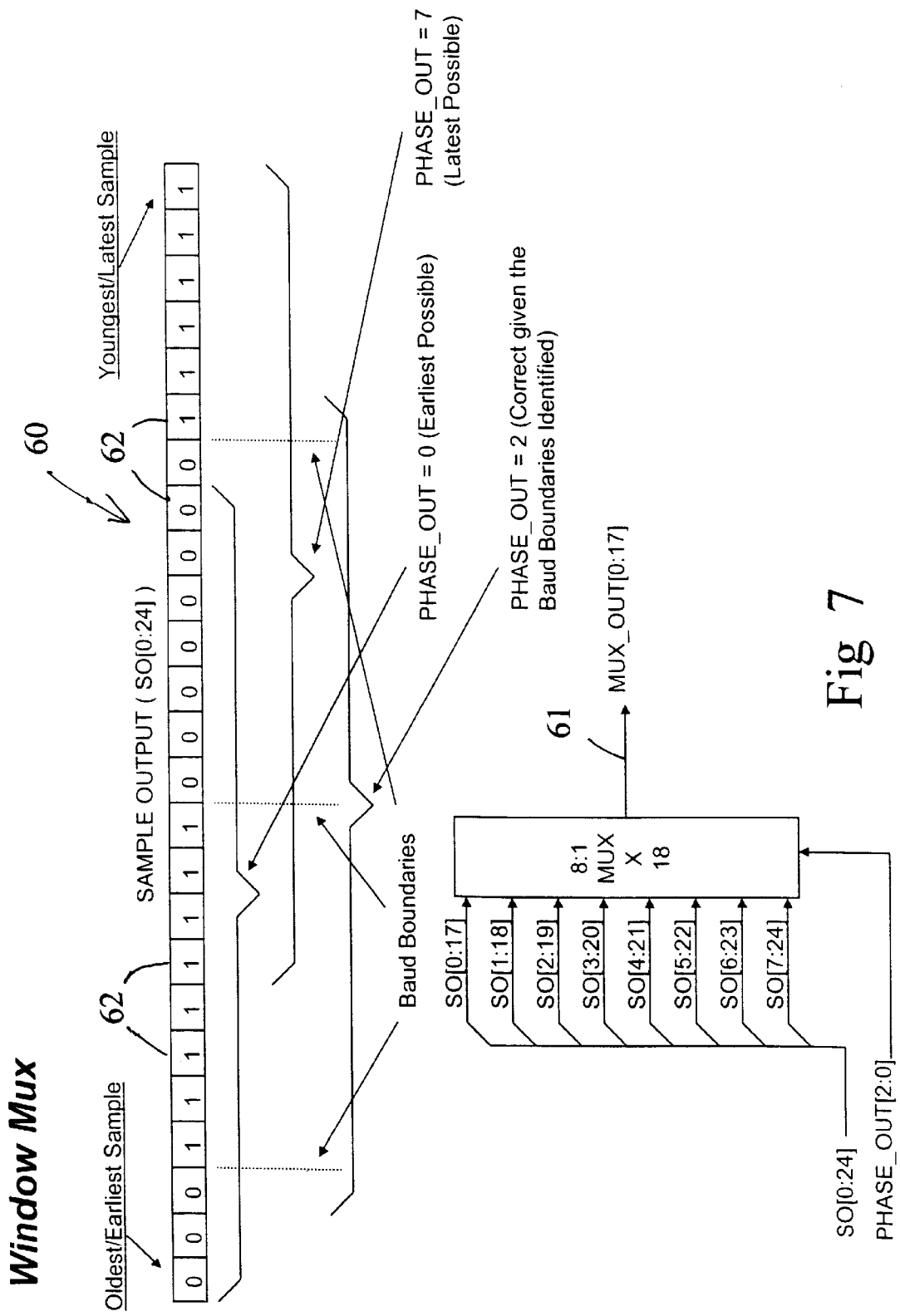
FIG. 7 is a Window Mux Schematic.

FIG. 7 shows a block diagram of the Window Multiplexor 60 and also shows an example of an in coming sample pattern 62 from the Sample Out Block. In this example, with the baud boundaries identified as shown, the control input of the Window Multiplexor 60 (PHASE_OUT[2:0]) should be set to a value of 2. This will allow for optimum decoding since all the bits in each baud window (bits 1:8 and 9:15) represent the samples of exactly one baud with out any samples from adjacent bauds. It should be noted that it is only necessary to decode the baud window represented by bits 9 through 15 since this is the only new information (bits 1 though 8 represent the baud that was decoded during the previous baud period).

It should also be noted that the Window Multiplexor 60 was designed to deliver two baud periods for the purpose of allowing the Early Late detector 81 in the DLL section of the Decoder block to have enough information to deal with potential problems caused by input streams that have very high deterministic jitter. If the application does not require such tolerance, then it would be acceptable to use a window multiplexor that delivered only one baud period (plus two additional bits to identify the baud boundaries).

Referring back to FIG. 5, bits 10 through 15 of the output of the Window Multiplexor are sent to the Decode Bit block 70. The baud window for the bit to be decoded includes Window Multiplexor Output bits 9 thought 16. However, the outer samples of the baud window are not particularly useful in the determining the value of the data baud since they may be significantly affected by jitter. Consequently, in the preferred embodiment, the Decode Bit block 70 considers only bits 10 through 15.

The Decode Bit block 70 determines the value of the baud by examining the 6 samples supplied. If there are more one samples than zero samples, the baud is decoded as a one. If there are more zero samples that one samples, the baud is decoded as a zero. In the event of a tie (same number of zero samples as one samples) weight is given to the center samples. For example if 3 of samples 11 through 14 (from the Window Multiplexor Output) were one, the baud would be decoded as a one even though the overall input to the Decode Bit block (bits 10 through 15) had the same number of ones as zeros. Similarly, if both of samples 12 and 13 were zero, the baud would be decoded as a zero in spite of the fact that samples 11 through 14 had two ones and two zeros and samples 10 through 15 had 3 ones and 3 zeros. In the event that the appropriate decode is still ambiguous, the Decode Bit block 70 will arbitrarily generate a value that is the opposite of the previous decode. The Decode Bit block described herein is the preferred form of the invention; however, other suitable algorithms may be used to reconstruct the correct baud value from sampled input data.

Referring back to FIG. 5, the output of the Window Multiplexor 60 is also sent to the "Early/Late Detector" 81 of the DLL 80 that controls the Window Multiplexor. As mentioned earlier, when the Window Multiplexor 60 is configured optimally, baud boundaries should occur between bits 0 and 1, bits 8 and 9, and bits 16 and 17. Baud boundaries can be identified as the place where the sampled data transitions from a 0 to 1 or vice-versa. Consequently, if the baud boundaries are consistently late with respect to the sample window (ex. transitions occur between bits 2 and 3 and/or bits 10 and 11), then the DLL 80 will increase the Window Multiplexor Control Input (PHASE_OUT[2:0]) in order to delay the sample window. Similarly, if the baud boundaries are consistently early with respect to the sample window (ex. Transitions occur between bits 6 and 7 and/or bits 14 and 15), then the DLL 80 will decrease the Window Multiplexor Control Input (PHASE_OUT[2:0]) in order to advance the sample window.

It should be noted that if PHASE_OUT[2:0] is already equal to zero then it will be impossible to advance the sample window further. In this environment, "decreasing" the Window Multiplexor Control Input further will result in the PHASE_OUT[2:0] control transitioning from 0 to 7. Thus, the sample time will, in actual fact, be delayed by $\frac{7}{8}^{th}$ of a baud period, rather than advanced by $\frac{1}{8}^{th}$ of a baud period. From a sampling point of view this is perfectly acceptable since the two operations are equivalent. However, from a skew calculation point view, this presents some level of ambiguity and complexity since it is important to distinguish between a baud that is $\frac{1}{8}^{th}$ of a baud period early with respect to some known reference and a baud that is $\frac{7}{8}^{th}$ of a baud period late with respect to that same reference. The reverse is true if PHASE_OUT[2:0] is already 7 and sample time needs to be delayed further.

Figure 8:
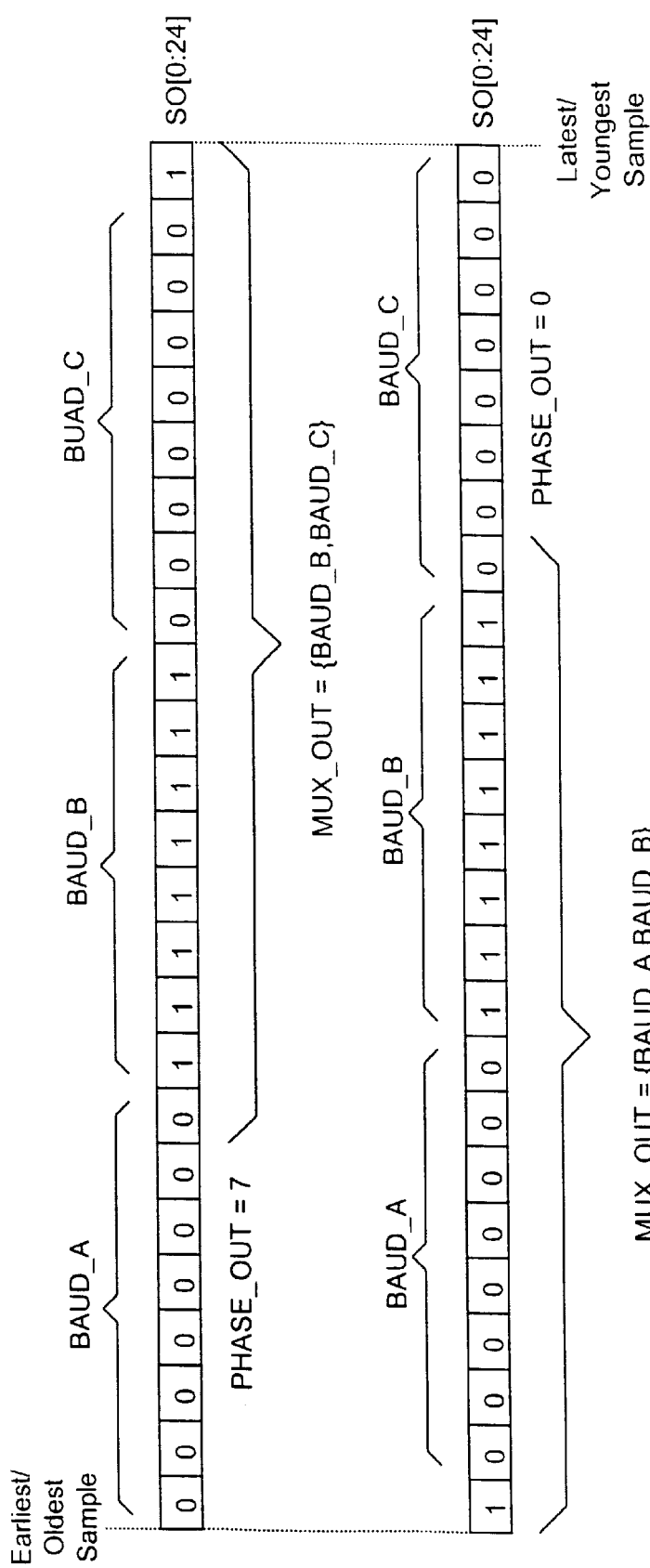
FIG. 8 is a Wrap Schematic.

FIG. 8 shows one typical operation of the Sample Out registers (SO[0:24]) for 2 channels which illustrates a condition referred to herein as a "wrap" condition. For the sake of clarity of description, it is assumed that the channels are receiving identical data patterns (although this is by no means essential for the correct operation of the invention). In this example, the lower channel lags the upper channel by one sample interval. For reference purposes, it is noted that the correct alignment for the Window Multiplexor is 7 (PHASE_OUT=7) for the upper channel and 0 (PHASE_OUT=0) for the lower channel. It should be noted that if the PHASE_OUT status only were examined for each channel, it would appear (incorrectly) that the lower channel is leading the upper channel by $7/8^{th}$ of a baud period (since, as can be seen in FIG. 8, the lower channel is being sampled $7/8^{th}$ of a baud period earlier than the upper channel). However, if the output of the Window Multiplexor (MUX_OUT) is examined, it can be seen that the upper channel is outputting "BAUD_B" and "BAUD_C" while the lower channel is outputting "BAUD_A" and BAUD_B". Thus, it can be seen that the lower channel is, in actual fact, one baud behind the upper channel. This situation is defined herein as a "wrap" condition. A "wrap" is defined as the combination of the following two conditions:

1. The nominal phase of channel n with respect to channel N+1 would seem to indicate that channel N+1 is leading channel N.
2. The output of the "Window Multiplexor" (MUX_OUT) for channel N+1 is one baud behind the output of the "Window Multiplexor" (MUX_OUT) for channel N.

FIG. 9 shows a second typical possible operation of the Sample Out register which illustrates a condition referred to herein as a "reverse-wrap" condition. In this example, the lower channel leads the upper channel by one sample interval. For reference purposes, it is noted that the correct alignment for the Window Multiplexor is 0 (PHASE_OUT=0) for the upper channel and 7 (PHASE_OUT=7) for the lower channel. Once again, if only the relative phase of the channels were examined, it would be concluded (incorrectly) that the lower channel is lagging the upper channel by $7/8^{th}$ of a baud period (since, as can be seen in FIG. 9, the lower channel is being sampled $7/8^{th}$ of a baud period later than the upper channel). However, if the output of the Window Multiplexor (MUX_OUT) is examined, it can be determined that the upper channel is outputting "BAUD_A" and "BAUD_B" while the lower channel is outputting "BAUD_B" and "BAUD_C". Thus, it can be seen that the lower channel is, in actual fact, one baud ahead of the upper channel. This situation is defined herein as a "reverse-wrap" condition. A "reverse-wrap" is defined as the combination of the following two conditions:

1. The nominal phase of channel N with respect to channel N+1 would seem to indicate that channel N+1 is lagging channel N.
2. The output of the "Window Multiplexor" (MUX_OUT) for channel n+1 is one baud ahead of the output of the "Window Multiplexor" (MUX_OUT) for channel N.

Referring to FIG. 9, if the data were to arrive as shown in the "alternate interpretation of lower channel" box, then the apparent phase relationship would be exactly the same as described above (upper channel, PHASE_OUT=0; lower channel, PHASE_OUT=7). However, the relationship between the bauds is completely different. In this case, the lower channel really is lagging the upper channel by $7/8^{th}$ of a baud period. This can be seen by examining the output of the "Window Multiplexor" for each channel, since they are now equivalent. This point is mentioned to make it clear that only condition 1 of the "wrap" and "reverse-wrap" tests described can be determined by examining the incoming data streams alone. Additional information is required in order to make a correct determination for condition 2.

This additional information can be derived from the second assumption ("Skew between adjacent channels varies less than 1-bit time at the receiver"). Thus, in the preferred embodiment, two possible interpretations are made of the incoming receive data. The first interpretation assumes that channel N+1 will always be (after quantization) between 0 and $7/8^{th}$ of a baud period later than channel N as shown in FIG. 1 (in practical application, this would always be true for relatively long fibers that were less than 2-kilometers long). The second interpretation assumes that channel N+1 will always be (after quantization) between $1/4^{th}$ of a baud period earlier than channel N and $5/8^{th}$ of a baud period later than channel N as shown in FIG. 2 (in practical application, this would be true for relatively short fibers). Note, that both of the proposed interpretations follow the main rule ("Skew between adjacent channels varies less than 1-bit time at the receiver").

The logic proposed in FIG. 10 would be sufficient to perform "wrap" detection between adjacent channels under the first interpretation described above. Note that in this case "reverse wrap" detection is not necessary. The logic proposed in FIG. 11 would be sufficient to perform "wrap" and "reverse wrap" detection between adjacent channels under the second interpretation described above. At this point, enough information has not been obtained to resolve ambiguity and to know which interpretation is correct. Consequently, both interpretations are processed concurrently in the preferred embodiment.

Note, depending on the type of media and the quality of the transmit and receive electronics it may or may not be necessary to consider additional interpretations. Should practical considerations require use of a longer fiber, then it might be necessary to consider a "double wrap" condition (a condition where the data on channel N is 2 bauds ahead of channel N+1). Had the variation in the transmit/receive electronics and optics been more severe, interpretations in addition to the 2 that were described would have been necessary. Similarly, in the presence of less variation, only one of the interpretations described may have been necessary.

Now that the system is able to determine "wrap" and "reverse-wrap" conditions between adjacent channels, the logic that compensates for the skew between channels is now described. The sampling logic has already aligned the incoming data such that all decoded bits arrive at the same time. Consequently, the only remaining problem is to line up the bauds such that bauds that were launched simultaneously from the transmitter will be decoded simultaneously at the receiver. As mentioned earlier, this can be accomplished using "wrap" and "reverse-wrap" information.

Figure 12:
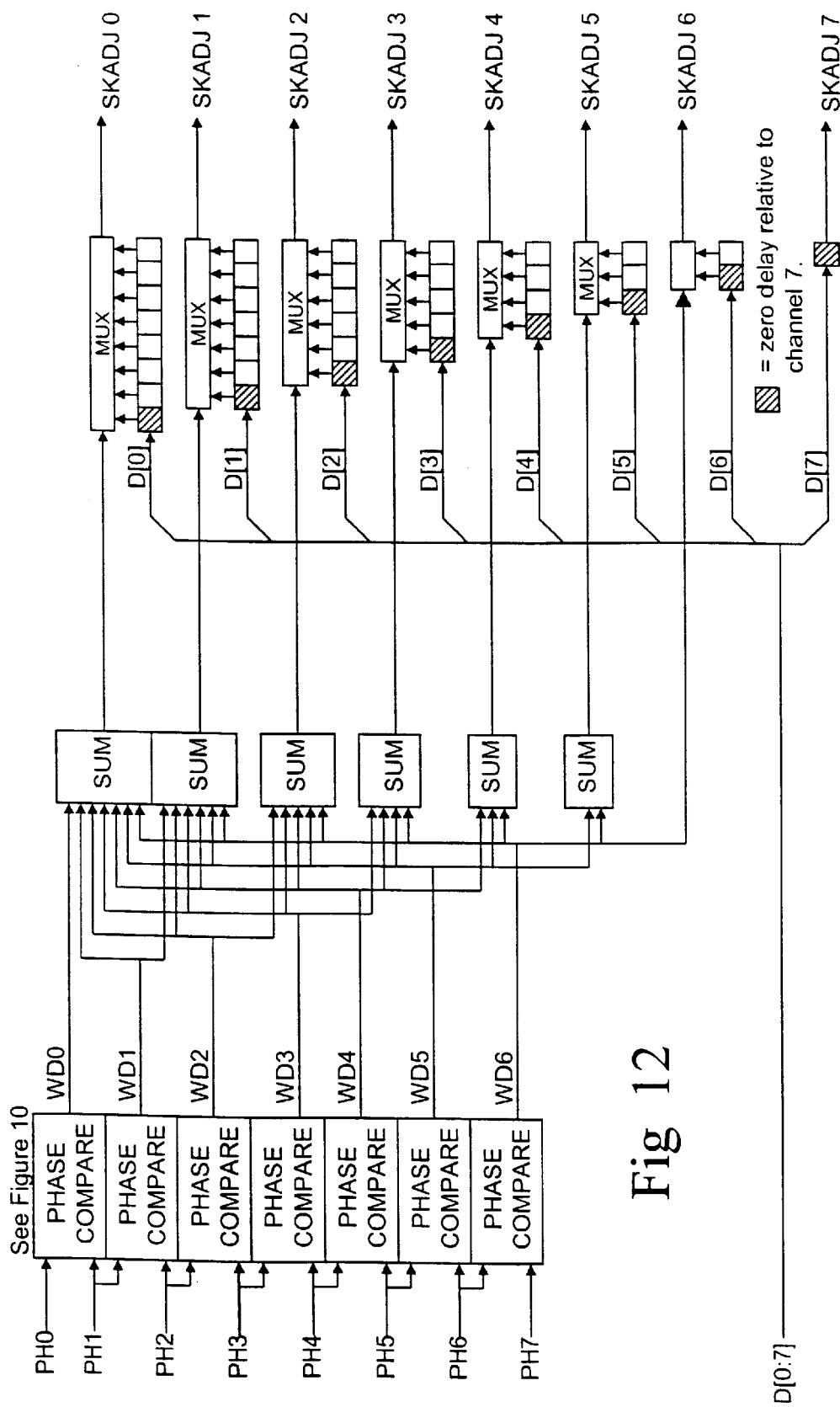
FIG. 12 is a Skew Compensation (No Reverse Wrap) Block Diagram.

FIG. 12 shows skew compensation logic based on the assumption that channel N+1 will always be (after quantization) between 0 and $7/8^{th}$ of a baud period later than channel N as shown in FIG. 1. This skew compensation logic takes the phase (PH0-7) and data outputs (D[0:7]) from FIG. 4 as its inputs.

As shown in FIG. 12, the system begins by comparing the phase of channel "N" to channel "N+1" for all channels where "N+1" may be defined (in this case channels 0 through 6) using the algorithm described in FIG. 10. If "wrap detect" is true, then WD"N" is set to a 1. Otherwise, WD"N" will be set to a 0.

Referring back to the definition of a "wrap," if a wrap is detected between channel N and channel N+1, then the output from the window mux for channel N will be one baud ahead of the output of the window mux for channel N+1. To compensate for this skew, channel N must be delayed one baud time relative to channel N+1. This can be accomplished using a simple register delay as shown in FIG. 12.

For example, if a "wrap" was detected between channels 6 and 7, then the mux shown for data channel 6 would select the register output which was delayed by 1 clock with respect to channel 7. Conversely, if no wrap was detected between channels 6 and 7, then mux shown for data channel 6 would select the register output which had no delay with respect to channel 7.

Now assume that a "wrap" was detected between channels 5 and 6 and between channels 6 and 7. In this case, the mux shown for data channel 6 would select the register output which was delayed by 1 clock with respect to channel 7. Similarly, the mux shown for data channel 5 would have select the register output which was delayed by 1 clock with respect to channel 6. However, being delayed by one clock with respect to channel 6 is equivalent to being delayed by 2 clocks with respect to channel 7. Thus, the following generalization can be made for the remaining channels:

If there are "k" channels in the skew compensation system numbered 0 through "k−1".

If those channels behave in such a way that "wrap" detection as defined in FIG. 10 is valid.

If the variable "n" is defined as representing the particular channel for which the number of delay stages must be calculated where n is greater than or equal to zero and less than or equal to k−2.

If "wd(n)" is defined as the result of the wrap detect operation defined in FIG. 10 between channels n and n+1.

If "d(n)" is defined as the appropriate number of delay stages relative to channel k−1 required to compensate for the skew between channel n and channel k−1.

Then d(n)=sum, in the range of n to k−2, wd(n).

Ex. d(6)=wd(6); d(5)=wd(5)+wd(6);
d(0)=wd(0)+wd(1)+wd(2)+wd(3)+wd(4)+wd(5)+wd(6)

The sum blocks shown in FIG. 12 perform the sum operations defined above. The output of the sum blocks is then fed in to the mux's that control the delay that is selected for each channel. The delay is actually implemented with an appropriately sized shift register. The size of the shift register needed can be determined by determining the range of the mux. The range of the mux may determined by calculating the maximum number of "wraps" which may occur between the channel in question and channel 7). For each mux, a control input of zero would indicate no delay with respect to channel 7. Larger values applied to the control input of the mux would select increasing delay with respect to channel 7.

Figure 13:
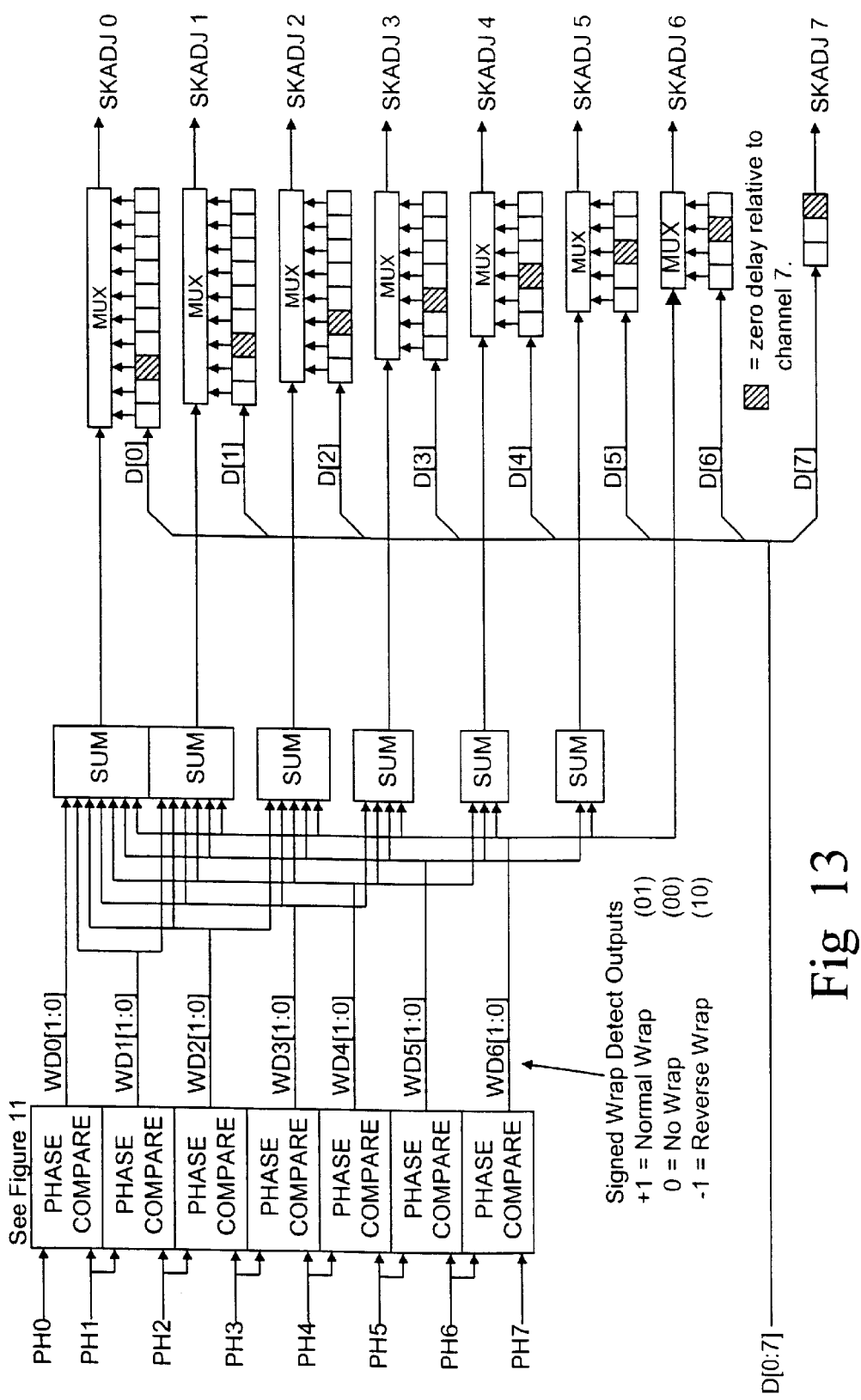
FIG. 13 is a Skew Compensation (With Reverse Wrap) Block Diagram.

FIG. 13 shows skew compensation logic based on the assumption that channel n+1 will always be (after quantization) between $¼^{th}$ of a baud period earlier than channel n and $⅝^{th}$ of a baud period later than channel n as shown in FIG. 2. This skew compensation logic takes the phase (PH0-7) and data outputs (D[0:7]) from FIG. 4 as its inputs.

As shown in FIG. 13, the system begins by comparing the phase of channel "n" to channel "n+1" for all channels where "n+1" may be defined (in this case channels 0 through 6) using the algorithm described in FIG. 11. If "wrap detect" is true, then WD"n"[1:0] is set to "+1" (01). If "reverse wrap detect" is true, then WD"n"[1:0] is set to "−1" (10). Otherwise, WD"n"[1:0] will be set to 0 (00).

Referring back to the definition of a "wrap," if a wrap is detected between channel n and channel n+1, then the output from the window mux for channel n will be one baud ahead of the output of the window mux for channel n+1. To compensate for this skew, channel n must be delayed one baud time relative to channel n+1.

Referring back to the definition of a "reverse-wrap", if a wrap is detected between channel n and channel n+1, then the output of the window mux for channel n will be one baud behind the output of the window mux for channel n+1. To compensate for this skew, channel n must be advance one baud time relative to channel n+1.

The "wrap" case for FIG. 13 behaves exactly as was described for FIG. 12. No further discussion is required. However, implementing a "reverse-wrap" is more interesting since it is not possible for a causal system to really advance a signal in time. However, it is possible for a causal system to reduce the delay of one signal relative to another assuming both signals had been delayed to start with. Thus, in FIG. 13, all channels, including channel 7, are delayed 2 additional clock times by default. As a result, if a "reverse-wrap" is detected between channels 6 and 7, then the mux for data channel 6 would select the register output which was delayed by 1 less clock time than channel 7. This has the net effect of advancing channel 6 with respect to channel 7.

With regard to calculating the appropriate delay for the remaining channels, the same rules apply as described for FIG. 12. The only differences being that since a "reverse-wrap" must be considered:

1. Signed addition must be used instead of unsigned.
2. The result of the sums that control the muxs must be offset to take into account the additional delays inserted in order to implement the possibility of a "reverse-wrap."

Figure 14:
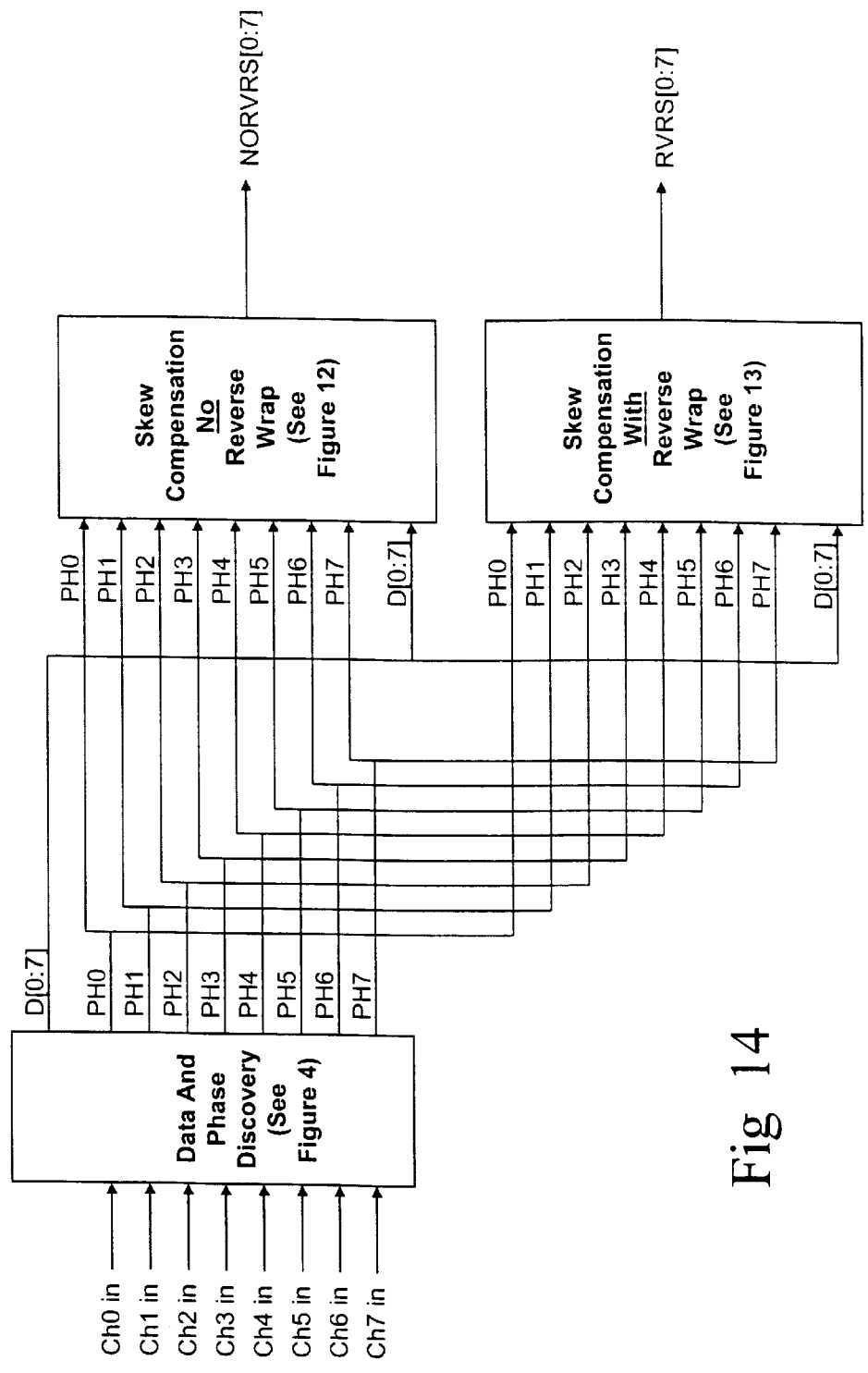
FIG. 14 is a Skew Discovery and Compensation System Block Diagram.

FIG. 14 shows the skew discovery and compensation system herein described. In the preferred embodiment, the data and phase discovery block is implemented as shown in FIG. 4. The skew compensation without reverse-wrap block is implemented as shown in FIG. 12. The skew compensation with reverse-wrap block is implemented as shown in FIG. 13.

FIG. 14 has two outputs. The "long fiber" output will reflect properly aligned data based on the assumption that channel N+1 is between 0 and $⅞^{th}$ of a bit cell later than Channel N. The "short fiber" output will reflect properly aligned data based on the assumption that Channel N+1 is between $¼^{th}$ of a bit cell earlier than Channel N and $⅝^{th}$ of a bit cell later than Channel N.

Figure 15:
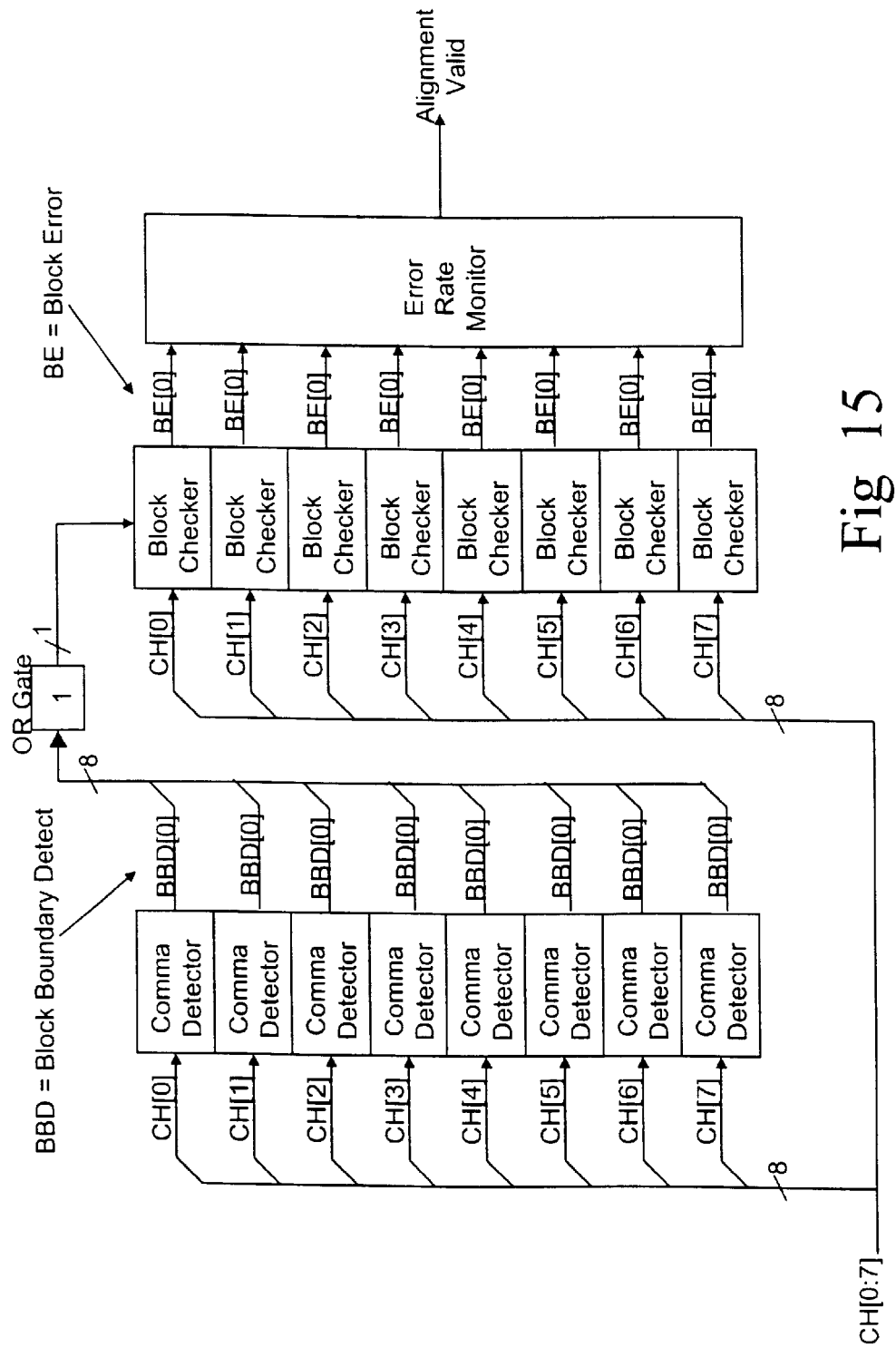
FIG. 15 is an Alignment Checker Block Diagram.

Each output is sent to an Alignment Checker. This alignment checker is shown in FIG. 15. The alignment checking process begins with each channel being sent through a "Comma Detector." The implementation of the "Comma Detector" is described in the 802.3 standard describing 8b10b encoding incorporated herein by reference. Comma checking is necessary on each channel to establish the location of a block boundary since there is no guarantee that comma blocks will occur on every channel but there is a guarantee that they will occur periodically on at least one channel (see assumptions). Moreover, based on the assumptions, if location of baud boundaries on one channel is known, then expected location of baud boundaries on the other channels is also known. This information can be used to decode the data on all eight channels. Only a minimal decoder is required for this function since the purpose of the decoder is to check for valid symbols. If the alignment is correct coming from the skew compensation logic, no invalid or misaligned code blocks (comma blocks where the block boundaries do not appear as expected) should be detected. A "code block," as used herein and in the claims, is the standard 10 bit representation of encoded data in 8b10b coding. If the alignment is incorrect, then errors will occur regularly. Thus, the Skew Compensation output that reports no errors will be selected as the final output of the Skew Compensation system using a multiplexor. If both outputs report no errors, then one of the outputs must be selected arbitrarily. It is possible for multiple skew compensation blocks to generate correct outputs since there may be overlap between the assumptions that drive them.

For example, a medium length fiber may never generate a "reverse wrap" condition. Similarly, because the delays are small, both skew compensation blocks will successfully detect "normal wrap" conditions. Thus, both Skew Compensation blocks will generate correct outputs. If both outputs are correct, it does not matter which one is selected as the final output.

It should be noted that communication links will always contain at least some errors. Consequently, the alignment checker must be insensitive to infrequent errors. The acceptable error rate will depend on the application of the link. An Error Rate Monitor (as shown in FIG. 15) acceptable for selecting the correct skew compensation output without changing that selection as a result of occasional normal channel errors.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for detecting and compensating for bit skew between N parallel data streams having the same frequency and being transmitted on a single fiber in a WDM system wherein each of said data streams uses 8b10b encoding and wherein each data stream is a series of bit cells with bit cell boundaries, wherein the skew between the fastest and slowest of said N data streams may exceed a bit cell, and without requiring the use of a training or sampling sequence and without modifying any of the N data streams, comprising the steps:

recovering the frequency of a selected first of said N incoming data streams, generating an X phase reference clock from said selected first of said N incoming data streams, using said X phases to sample bits from said selected first incoming data stream at X times per baud period, and using said X phases to sample the remaining channels at X times per baud period, using said samples to determine the location of the bit cell boundaries for each of said N channels, determining the phase of each of said N data streams, using said bit cell boundaries, comparing said phase of the data streams on adjacent channels beginning with comparing said first and second channels to determine a skew between said first and second channels, and then comparing said phase of data streams on said second and third channels and continuing said comparisons of adjacent channels until comparing the phase of data streams on N-1 channel with N channel, and passing said determined skew between adjacent channels into an aligner wherein said aligner is programmed to assume a range of skew between adjacent pairs of said N channels, and wherein said aligner uses said skew to align said N data streams based on said programming with an assumed skew range.

2. A method for detecting and compensating for bit skew between N parallel data streams having the same frequency and being transmitted on a single fiber in a WDM system wherein each of said data streams uses 8b10b encoding and wherein each data stream is a series of bit cells with bit cell boundaries, wherein the skew between the fastest and slowest of said N data streams may exceed a bit cell, wherein the range of skews between adjacent channels may exceed a bit cell, and without requiring the use of a training or sampling sequence and without modifying any of the N data streams, comprising the steps:

recovering the frequency of a selected first of said N incoming data streams, generating an X phase reference clock from said selected first of said N incoming data streams, using said X phases to sample bits from said selected first incoming data stream at X times per baud period, and using said X phases to sample the remaining channels at X times per baud period, using said samples to determine the location of the bit cell boundaries for each of said N channels, determining the phase of each of said N data streams, using said bit cell boundaries, comparing said phase of the data streams on adjacent channels beginning with comparing said first and second channels to determine a skew between said first and second channels, and then comparing said phase of data streams on said second and third channels and continuing said comparisons of adjacent channels until comparing the phase of data streams on N-1 channel with N channel, passing said determined skew between adjacent channels into two or more aligners wherein each aligner is programmed to assume a different range of skew between adjacent pairs of said N channels, and wherein each aligner will use said skews to align said N data streams based on said programming with an assumed skew range, passing each of said two or more aligned data streams through an 8b10b decoder for each aligned data stream, having each of said decoders check the alignment of the block boundaries of the output of its associated aligner, and selecting the output of one of said aligners determined by said decoders to be correctly aligned.

3. Apparatus for detecting and compensating for bit skew between N parallel data streams having the same frequency and being transmitted on a single fiber in a WDM system wherein each of said data streams uses 8b10b encoding and wherein each data stream is a series of bit cells with bit cell boundaries, wherein the skew between the fastest and slowest of said N data streams may exceed a bit cell, and without requiring the use of a training or sampling sequence and without modifying any of the N data streams, comprising the steps:

means for recovering the frequency of a selected first of said N incoming data streams, clock means for generating an X phase reference clock from said selected first of said N incoming data streams, sampling means for using said X phases to sample bits from said selected first incoming data stream at X times per baud period, and using said X phases to sample the remaining channels at X times per baud period, and for using said samples to determine the location of the bit cell boundaries for each of said N channels, means for determining the phase of each of said N data streams, using said bit cell boundaries, phase comparator means for comparing said phase of the data streams on adjacent channels beginning with comparing said first and second channels to determine a skew between said first and second channels, and then comparing said phase of data streams on said second and third channels and continuing said comparisons of adjacent channels until comparing the phase of data streams on N−1 channel with N channel, and aligner means for receiving said determined skews between adjacent channels wherein said aligner means is programmed to assume a range of skew between adjacent pairs of said N channels, and wherein said aligner means uses said phase differentials to align said N data streams based on said programming with an assumed skew range.

4. Apparatus for detecting and compensating for bit skew between N parallel data streams having the same frequency and being transmitted on a single fiber in a WDM system wherein each of said data streams uses 8b10b encoding and wherein each data stream is a series of bit cells with bit cell boundaries, wherein the skew between the fastest and slowest of said N data streams may exceed a bit cell, wherein the range of skews between adjacent channels may exceed a bit cell, and without requiring the use of a training or sampling sequence and without modifying any of the N data streams, comprising the steps:

means for recovering the frequency of a selected first of said N incoming data streams, clock means for generating an X phase reference clock from said selected first of said N incoming data streams, sampling means for using said X phases to sample bits from said selected first incoming data stream at X times per baud period, and using said X phases to sample the remaining channels at X times per baud period, and for using said samples to determine the location of the bit cell boundaries for each of said N channels, means for determining the phase of each of said N data streams, using said bit cell boundaries, phase comparator means for comparing said phase of the data streams on adjacent channels beginning with comparing said first and second channels to determine a skew between said first and second channels, and then comparing said phase of data streams on said second and third channels and continuing said comparisons of adjacent channels until comparing the phase of data streams on N−1 channel with N channel, aligner means for receiving said determined skews between adjacent channels into two or more aligners wherein each aligner is programmed to assume a different range of skew between adjacent pairs of said N channels, and wherein said aligner uses said skews to align said N data streams based on said programming with an assumed skew range, decoder means for receiving each of said two or more aligned data streams through a separate 8b10b decoder for each aligned data stream, and wherein each of said decoders checks the alignment of the block boundaries of the output of its associated aligner, and means for selecting the output of one of said aligners determined by said decoders to be correctly aligned.

* * * * *